(12) United States Patent
Niu (10) Patent No.: US 10,332,392 B2
(45) Date of Patent: Jun. 25, 2019

(54) METHOD AND SYSTEM FOR SEGMENTALLY LIMITING SPEED OF VEHICLE

(71) Applicant: STREAMAX TECHNOLOGY CO., LTD., Shenzhen, Guangdong (CN)

(72) Inventor: Xuheng Niu, Shenzhen (CN)

(73) Assignee: STREAMAX TECHNOLOGY CO., LTD., Shenzhen (CN)

( * ) Notice: Subject to any disclaimer, the term of this patent is extended or adjusted under 35 U.S.C. 154(b) by 236 days.

(21) Appl. No.: 15/325,691

(22) PCT Filed: Jul. 16, 2015

(86) PCT No.: PCT/CN2015/084202
§ 371 (c)(1),
(2) Date: Jan. 11, 2017

(87) PCT Pub. No.: WO2017/008295
PCT Pub. Date: Jan. 19, 2017

(65) Prior Publication Data
US 2018/0144625 A1    May 24, 2018

(51) Int. Cl.
*G08G 1/00* (2006.01)
*G08G 1/052* (2006.01)
(Continued)

(52) U.S. Cl.
CPC .......... *G08G 1/052* (2013.01); *B60K 31/18* (2013.01); *B60K 2031/0091* (2013.01); *G01P 3/803* (2013.01)

(58) Field of Classification Search
USPC ........................................................ 701/93
See application file for complete search history.

(56) References Cited

U.S. PATENT DOCUMENTS 5,689,252 A * 11/1997 Ayanoglu ........... G01C 21/3492
340/905
6,121,898 A * 9/2000 Moetteli ................ G08G 1/052
340/905
(Continued)

FOREIGN PATENT DOCUMENTS

CN    103714701    4/2014
CN    103680153    7/2015
(Continued)

*Primary Examiner* — Jonathan L Sample
(74) *Attorney, Agent, or Firm* — Loza & Loza, LLP; Michael F. Fedrick (57) ABSTRACT

The present invention provides a method and system for segmentally limiting the speed of a vehicle. The method comprises: receiving characteristic parameters of a route sent by a vehicle monitoring platform, and respectively expanding a plurality of road segments of the route into a plurality of rectangles; dividing the plurality of rectangles into blocks sequentially; calculating a minimum enclosing rectangle of the at least two rectangles, and counting vertex information of the minimum enclosing rectangle of each block so as to establish a hash table; obtaining an instant longitude and latitude of a moving vehicle, searching in the hash table so as to determine a block where the vehicle is located, and judging a road segment where the vehicle is currently located; and comparing a current speed of the vehicle with a limiting speed of the road segment where the vehicle is currently located, judging whether the vehicle exceeds the limiting speed.

8 Claims, 6 Drawing Sheets

(51) Int. Cl.
  *B60K 31/18* (2006.01)
  *B60K 31/00* (2006.01)
  *G01P 3/80* (2006.01)

(56) References Cited

U.S. PATENT DOCUMENTS

| | | | | |
|---|---|---|---|---|
| 6,161,072 A * | 12/2000 | Clapper | B60K 31/0058 | 180/170 |
| 6,462,675 B1 * | 10/2002 | Humphrey | G08G 1/052 | 340/441 |
| 6,693,555 B1 * | 2/2004 | Colmenarez | G08G 1/096716 | 340/441 |
| 6,778,074 B1 * | 8/2004 | Cuozzo | G01D 7/00 | 340/441 |
| 7,042,345 B2 * | 5/2006 | Ellis | A61H 3/061 | 340/436 |
| 7,616,781 B2 * | 11/2009 | Schofield | G06K 9/00818 | 382/104 |
| 7,711,468 B1 * | 5/2010 | Levy | B60W 30/143 | 340/441 |
| 8,725,394 B2 * | 5/2014 | Bahlmann | B60W 30/146 | 340/907 |
| 9,251,703 B1 * | 2/2016 | Mbekeani | G08G 1/091 | |
| 9,286,800 B2 * | 3/2016 | Gordon | G08G 1/09 | |
| 9,557,179 B2 * | 1/2017 | Finlow-Bates | G08G 1/09626 | |
| 9,679,487 B1 * | 6/2017 | Hayward | G08G 1/166 | |
| 2002/0027511 A1 * | 3/2002 | Horita | G08G 1/0962 | 340/988 |
| 2002/0159270 A1 * | 10/2002 | Lynam | B60K 35/00 | 362/492 |
| 2002/0186228 A1 * | 12/2002 | Kobayashi | B60K 35/00 | 345/633 |
| 2004/0075582 A1 * | 4/2004 | Bergan | G08G 1/01 | 340/936 |
| 2005/0232469 A1 * | 10/2005 | Schofield | G06K 9/00818 | 382/104 |
| 2005/0267658 A1 * | 12/2005 | Yuan | B60W 30/146 | 701/36 |
| 2006/0028330 A1 * | 2/2006 | Gallant | B60K 35/00 | 340/441 |
| 2006/0052909 A1 * | 3/2006 | Cherouny | B60K 28/063 | 701/1 |
| 2007/0027583 A1 * | 2/2007 | Tamir | G06Q 30/0283 | 701/1 |
| 2007/0050110 A1 * | 3/2007 | Kondoh | B60K 31/18 | 701/36 |
| 2008/0221787 A1 * | 9/2008 | Vavrus | G01C 21/3469 | 701/423 |
| 2008/0249706 A1 * | 10/2008 | Bradai | B60Q 1/085 | 701/532 |
| 2009/0024273 A1 * | 1/2009 | Follmer | G06Q 10/10 | 701/33.4 |
| 2009/0079555 A1 * | 3/2009 | Aguirre De Carcer | G07C 5/008 | 340/441 |
| 2009/0115638 A1 * | 5/2009 | Shankwitz | G01C 21/26 | 340/988 |
| 2009/0201140 A1 * | 8/2009 | Fargas | B60W 40/101 | 340/441 |
| 2009/0240398 A1 * | 9/2009 | Nanami | B60W 40/04 | 701/41 |
| 2009/0243883 A1 * | 10/2009 | Simon | G08G 1/096716 | 340/905 |
| 2010/0045451 A1 * | 2/2010 | Periwal | B60Q 9/00 | 340/439 |
| 2010/0045452 A1 * | 2/2010 | Periwal | B60Q 9/00 | 340/439 |
| 2010/0312446 A1 * | 12/2010 | Schofield | G06K 9/00818 | 701/70 |
| 2011/0077028 A1 * | 3/2011 | Wilkes, III | B60W 50/14 | 455/456.3 |
| 2011/0093179 A1 * | 4/2011 | Schofield | G06K 9/00818 | 701/93 |
| 2011/0161004 A1 * | 6/2011 | Chao | G01C 21/3697 | 701/408 |
| 2011/0190972 A1 * | 8/2011 | Timmons | G01C 21/34 | 701/31.4 |
| 2011/0307155 A1 * | 12/2011 | Simard | F02D 11/105 | 701/93 |
| 2011/0307165 A1 * | 12/2011 | Hiestermann | G01C 21/32 | 701/119 |
| 2012/0059574 A1 * | 3/2012 | Hada | G08G 1/0112 | 701/119 |
| 2012/0140080 A1 * | 6/2012 | Taylor | B60C 23/0408 | 348/148 |
| 2012/0161982 A1 * | 6/2012 | Musachio | G08G 1/07 | 340/932 |
| 2012/0254707 A1 * | 10/2012 | Cooke | G01C 21/32 | 714/799 |
| 2013/0024060 A1 * | 1/2013 | Sukkarie | G01C 21/26 | 701/22 |
| 2013/0099914 A1 * | 4/2013 | Yoon | G01D 7/06 | 340/441 |
| 2013/0245945 A1 * | 9/2013 | Morita | G08G 1/096716 | 701/533 |
| 2013/0297095 A1 * | 11/2013 | Kwak | G06Q 10/0639 | 701/1 |
| 2013/0317730 A1 * | 11/2013 | Van Laethem | G08G 1/096716 | 701/119 |
| 2014/0039749 A1 * | 2/2014 | Jelbert | B60W 40/09 | 701/32.1 |
| 2014/0188376 A1 * | 7/2014 | Gordon | G08G 1/09 | 701/118 |
| 2014/0277835 A1 * | 9/2014 | Filev | G01C 21/3469 | 701/2 |
| 2014/0279587 A1 * | 9/2014 | Gafford | G06Q 50/18 | 705/311 |
| 2014/0304635 A1 * | 10/2014 | Kristinsson | G06F 3/0484 | 715/771 |
| 2015/0057831 A1 * | 2/2015 | Finlow-Bates | G08G 1/09626 | 701/1 |
| 2015/0219758 A1 * | 8/2015 | Gammenthaler | G01S 13/60 | 382/103 |
| 2015/0227316 A1 * | 8/2015 | Warfield | G06F 3/0611 | 711/103 |
| 2016/0042239 A1 * | 2/2016 | Fowe | G06T 7/20 | 382/104 |
| 2016/0082963 A1 * | 3/2016 | Slaton | B60W 30/143 | 701/93 |
| 2016/0185219 A1 * | 6/2016 | Sakata | G08G 1/16 | 701/36 |
| 2016/0362048 A1 * | 12/2016 | Matthews | G01S 19/14 | |

FOREIGN PATENT DOCUMENTS

| | | |
|---|---|---|
| CN | 103208187 | 8/2015 |
| JP | H0567294 | 3/1993 |

* cited by examiner

| (Xi, Yi) | (Xi+1, Yi+1) | Quadrant Changes | Arc length changes |
|---|---|---|---|
| (+, +) | (+, +) | I -> I | 0 |
| (+, +) | (-, +) | I -> II | 1 |
| (+, +) | (-, -) | I -> III | +/-2 |
| (+, +) | (+, -) | II -> IV | -1 |
| (-, +) | (+, +) | II -> I | -1 |
| (-, +) | (-, +) | II -> II | 0 |
| (-, +) | (-, -) | II -> III | 1 |
| (-, +) | (+, -) | II -> IV | +/-2 |
| (-, -) | (+, +) | III -> I | +/-2 |
| (-, -) | (-, +) | III -> II | -1 |
| (-, -) | (-, -) | III -> III | 0 |
| (-, -) | (+, -) | III -> IV | 1 |
| (+, -) | (+, +) | IV -> I | 1 |
| (+, -) | (-, +) | IV -> II | +/-2 |
| (+, -) | (-, -) | IV -> III | -1 |

Figure 6

METHOD AND SYSTEM FOR SEGMENTALLY LIMITING SPEED OF VEHICLE

CROSS-REFERENCE TO RELATED APPLICATIONS

This application is the U.S. national stage of International Patent Application No. PCT/CN2015/084202, filed on Jul. 16, 2015 and entitled METHOD AND SYSTEM FOR SEGMENTALLY LIMITING SPEED OF VEHICLE, The disclosure of which is incorporated herein by reference in its entirety.

TECHNICAL FIELD

The present application relates to the technical field of transportation management, and more particularly, relates to a method and system for segmentally limiting the speed of a vehicle.

BACKGROUND

With the increase of new-built and repaired highways, national highways, and international highways, traffic pressures are greatly relieved, vehicle flow speeds are accelerated, and carrying capabilities are improved. However, a comprehensive improvement of road conditions results in another problem, that is, the problem about excessive speed of vehicles. Many facts prove that driving at an excessive speed on a highway is a major reason for causing serious traffic accidents, and casualties and property loss caused by driving at the excessive speed on the highway is incredible. A vehicle excessive speed monitoring mechanism can give a deterrent to a driver who breaks the traffic rules and drives at the excessive speed, by using methods such as giving an economic punishment in combination with a score penalty, revoking a driving license, and so on, the driver can be forced to comply with the traffic rules, and the incidence of accident can be reduced to some extent.

Currently, aiming at excessive speed driving behaviors, generally speaking by a vehicle monitoring platform, a speed limit value of a current road segment is extracted from an instant longitude and latitude uploaded by a vehicular wireless monitoring terminal and the speed limit value of a current road segment is compared with an instant speed uploaded by the vehicular wireless monitoring terminal to determine whether the vehicle is in an excessive speed state. When the vehicle reaches the speed limit value, the vehicle monitoring platform sends a voice prompt to the vehicular wireless monitoring terminal to inform the driver that he/she is driving at the excessive speed; moreover, after the vehicle monitoring platform has collected excessive speed information, the driver gets a punishment correspondingly. There exists some problems in this monitoring method, as a certain time delay and data loss always occurs when the vehicular wireless terminal uploads the instant longitude and latitude and the instant speed; for this reason, the vehicle monitoring platform can't judge whether the vehicle is in the excessive speed state or not instantly.

SUMMARY OF THE INVENTION

A purpose of the embodiments of the present invention is: providing a method and system for segmentally limiting speed of a vehicle which aims at solving a problem that the aforesaid vehicle monitoring platform can't judge whether the vehicle is in an excessive state or not instantly.

The embodiments of the present invention are implemented in this way: a method for segmentally limiting speed of a vehicle, comprising:

receiving characteristic parameters of a route sent by a vehicle monitoring platform, and respectively expanding a plurality of road segments of the route into a plurality of rectangles according to the characteristic parameters of the route;

dividing the plurality of rectangles into blocks sequentially, wherein each block comprises at least two rectangles; calculating a minimum enclosing rectangle of the at least two rectangles, and counting vertex information of the minimum enclosing rectangle of each block so as to establish a hash table;

obtaining an instant longitude and latitude of a moving vehicle, searching in the hash table according to the instant longitude and latitude so as to determine a block where the vehicle is located, and judging a road segment where the vehicle is currently located by adopting a preset algorithm; and comparing a current speed of the vehicle with a limiting speed of the road segment where the vehicle is currently located, judging whether the vehicle exceeds the limiting speed; if yes, uploading excessive speed information and the instant longitude and latitude of the vehicle to the vehicle monitoring platform.

In the method for segmentally limiting speed of a vehicle, the step of receiving characteristic parameters of a route sent by a vehicle monitoring platform, and expanding a plurality of road segments of the route into a plurality of rectangles respectively according to the characteristic parameters of the route specifically comprises:

receiving characteristic parameters of the route sent by the vehicle monitoring platform, and adding index value for each of the road segments of the route and road inflection points in each of the road segments, wherein each of the road segments comprises a start inflection point and an end inflection point; and obtaining longitude and latitude of the start inflection point and the end inflection point, and a road width of each of the road segments from the characteristic parameters of the route according to the index value, and expanding each of the road segments into a rectangle respectively according to the longitude and latitude of the start inflection point and the end inflection point and the road width of each of the road segments.

In the method for segmentally limiting speed of a vehicle, the step of calculating the minimum enclosing rectangle of the at least two rectangles specifically comprises:

calculating longitude and latitude of a topmost vertex, a bottommost vertex, a leftmost vertex, and a rightmost vertex of each of the at least two rectangles, and obtaining the minimum enclosing rectangle of the at least two rectangles according to the longitude and latitude information of the topmost vertex, the bottommost vertex, the leftmost vertex, and the rightmost vertex.

In the method for segmentally limiting speed of a vehicle, the preset algorithm is an improved arc length algorithm, the step of judging a road segment where the vehicle is currently located by adopting the preset algorithm specifically comprises:

using the instant longitude and latitude as an origin of coordinate and establishing a rectangular coordinate system, and calculating a quadrant where each of vertexes in each rectangle is located respectively, wherein the rectangle is in the block where the vehicle is currently located;

selecting a rectangle from the block where the vehicle is currently located, accessing each of the vertexes of the rectangle according to a neighbor sequence, recording quadrant changes in each group of adjacent vertexes in the rectangle, searching in the hash table according to the quadrant changes and obtaining an arc length change in each group of adjacent vertexes, and calculating an arc length algebraic sum corresponding to the rectangle according to the arc length change in each group of adjacent vertexes;

determining a positional relationship between the instant longitude and latitude of the vehicle and the rectangle according to the arc length algebraic sum; and using the aforesaid method to traverse all rectangles in the blocks where the vehicle is currently located, and judging the road segment where the vehicle is currently located.

In the method for segmentally limiting speed of a vehicle, characteristic documents and the hash table generated after dividing of the rectangles is stored in a storage predetermined by a vehicular terminal; when the vehicle is operated, initializing vehicle information in a memory firstly by the vehicular terminal, and loading the hash list from the storage; and then when the block where the vehicle is located is found according to the hash list, loading the block information where the vehicle is currently located and block information of two blocks adjacent to the block where the vehicle is currently located from the storage into the memory, and ensuring that the memory stores data of three blocks subsequently and continuously; and updating data of three blocks in the memory simultaneously when the block where the vehicle is currently located has been changed.

Another purpose of the embodiments of the present invention is providing a system for segmentally limiting speed of a vehicle, comprising:

an expanded rectangle calculating module configured for receiving characteristic parameters of a route sent by a vehicle monitoring platform, and expanding a plurality of road segments of the route into a plurality of rectangles respectively according to the characteristic parameters of the route;

a hash table establishing module configured for dividing the plurality of rectangles into blocks sequentially, wherein each block comprises at least two rectangles, and calculating a minimum enclosing rectangle of the at least two rectangles, and counting vertex information of the minimum enclosing rectangle of each block so as to establish a hash table;

a current road segment calculating module configured for obtaining an instant longitude and latitude of a moving vehicle, searching in the hash table according to the instant longitude and latitude so as to determine a block where the vehicle is currently located, and determining a road segment where the vehicle is currently located by adopting a preset algorithm; and an excessive speed judging module configured for comparing a current speed of the vehicle with a limiting speed of the road segment where the vehicle is currently located, judging whether the vehicle exceeds the limiting speed, and uploading excessive speed information and the instant longitude and latitude of the vehicle to the vehicle monitoring platform if the vehicle exceeds the speed limit.

In the system for segmentally limiting speed of a vehicle, the expanded rectangle calculating module is specifically configured for:

receiving characteristic parameters of the route sent by the vehicle monitoring platform, and adding index value for each of the road segments of the route and road inflection points in each of the road segments, wherein each of the road segments comprises a start inflection point and an end inflection point; and obtaining longitude and latitude of the start inflection point and the end inflection point, and a road width of each of the road segments from the characteristic parameters of the route according to the index value, and expanding each of the road segments into a rectangle respectively according to the longitude and latitude of the start inflection point and the end inflection point and the road width of each of the road segments.

In the system for segmentally limiting speed of a vehicle, the hash table establishing module comprises:

a minimum enclosing rectangle calculating unit configured for calculating longitude and latitude information of a topmost vertex, a bottommost vertex, a leftmost vertex, and a rightmost vertex of each of the at least two rectangles, and obtaining the minimum enclosing rectangle of the at least two rectangles according to the longitude and latitude information of the topmost vertex, the bottommost vertex, the leftmost vertex, and the rightmost vertex.

In the system for segmentally limiting speed of a vehicle, wherein the current road segment calculating module comprises:

a coordinate system establishing unit configured for using the instant longitude and latitude as an origin of coordinate and establishing a rectangular coordinate system, and calculating a quadrant where each of vertexes in each rectangle is located respectively, wherein the rectangle is in the block where the vehicle is currently located;

an arc algebraic sum calculating unit configured for selecting a rectangle from the block where the vehicle is currently located, accessing each of the vertexes of the rectangle according to a neighbor sequence, recording quadrant changes in each group of adjacent vertexes in the rectangle, obtaining an arc length change of each group of adjacent vertexes by searching in the hash table according to the quadrant changes, and calculating an arc length algebraic sum corresponding to the rectangle according to the arc length change in each group of adjacent vertexes; and a judging unit configured for determining a positional relationship between the instant longitude and latitude of the vehicle and the rectangle according to the arc length algebraic sum.

In the system for segmentally limiting speed of a vehicle, wherein the hash table establishing module is further configured for storing characteristic documents and the hash table generated after dividing of the rectangles in a storage predetermined by a vehicular terminal; the current road segment calculating module is further configured for initializing vehicle information in a memory when the vehicle is operating and loading the hash list from the storage; when the block where the vehicle is currently located is searched according to the hash table, the block information where the vehicle is currently located and information of two blocks adjacent to the block information where the vehicle is currently located is loaded from the storage into the memory, and it is ensured that the memory stores data of three blocks subsequently and continuously, and data of three blocks in the memory is updated simultaneously when the block where the vehicle is currently located has been changed.

By implementing the method and system for segmentally limiting speed of a vehicle provided by the embodiments of the present invention, advantageous effects can be obtained as follows:

In the embodiments of the present invention, since the characteristic parameters of the route sent by the vehicle monitoring platform is received firstly, and the plurality of road segments of the route are expanded into a plurality of rectangles according to the characteristic parameters of the route; then, the plurality of rectangles are divided into blocks sequentially, each of the blocks comprises at least two rectangles, and the minimum enclosing rectangle of the at least two rectangles is calculated, and vertex information of the minimum enclosing rectangle in each of the blocks is collected so as to establish the hash table; finally, when the vehicle is operating, the instant longitude and latitude of the vehicle is obtained, and a search is performed in the hash table according to the instant longitude and latitude so as to determine the block where the vehicle is currently located, and the preset algorithm is adopted to determine the road segment where the vehicle is currently located; the current speed of the vehicle is compared with the speed limit value of the road segment where the vehicle is currently located, and whether the vehicle exceeds the speed limit or not is judged; if the vehicle exceeds the speed limit, the excessive speed information and the instant longitude and latitude of the vehicle are uploaded to the vehicle monitoring platform, such that the vehicular terminal can judges whether the vehicle exceeds the speed limit or not automatically; the system has a higher instantaneity and low memory usage; in addition, when the vehicle has exceeded the speed limit, the vehicle monitoring platform can be informed in time, so that an administrative staff of the vehicle monitoring platform can take corresponding measures for the driver who drives the vehicle at the excessive speed, and thus occurrence of safety accidents can be avoided.

DETAILED DESCRIPTION OF THE PREFERRED EMBODIMENT

In order to make the purposes, technical solutions, and advantages of the present invention be clearer and more understandable, the present invention will be further described in detail hereinafter with reference to the accompanying drawings and embodiments. It should be understood that the specific embodiments described herein are only intended to illustrate but not to limit the present invention.

Figure 1:
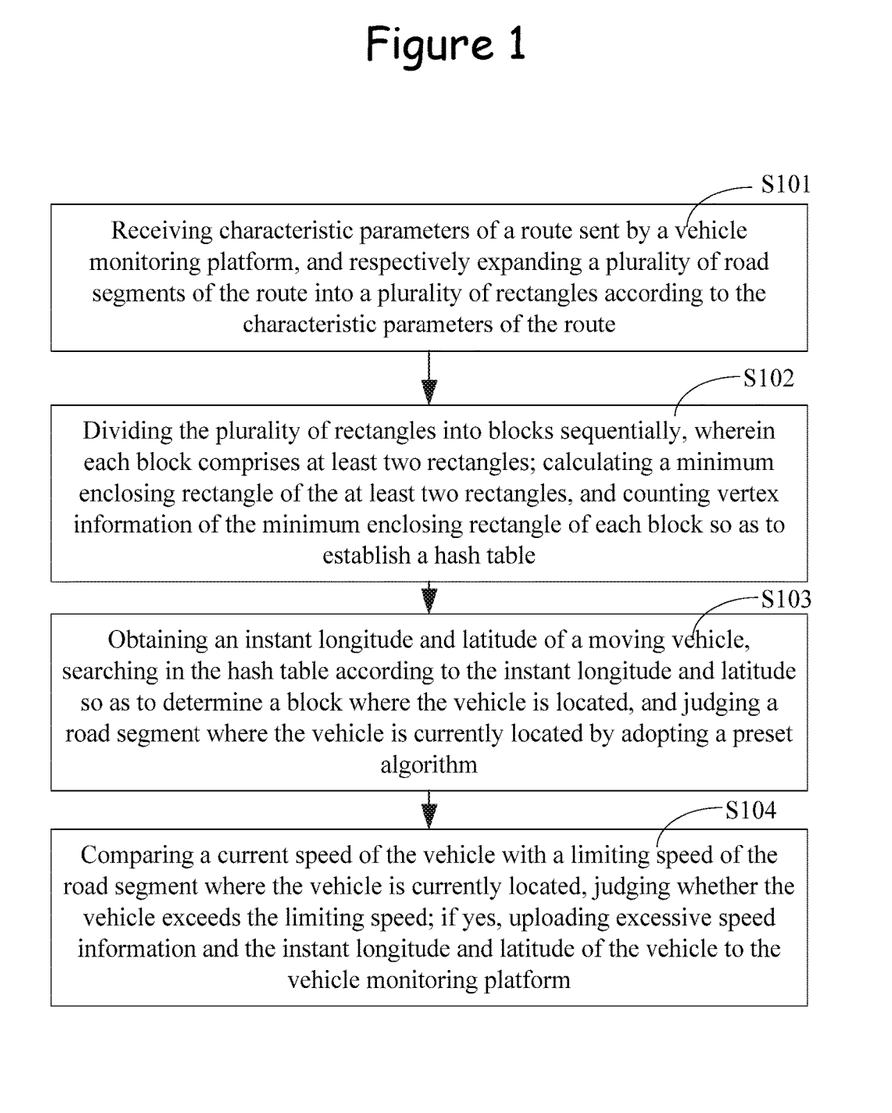
FIG. 1 illustrates a specific implementation flow diagram of a method for segmentally limiting speed of a vehicle provided by one embodiment of the present invention.

FIG. 1 illustrates a specific implementation flow chart of a method for segmentally limiting speed of a vehicle provided by one embodiment of the present invention, an executive object of the method is a vehicular terminal located in the vehicle. Please referring to FIG. 1, the method comprises:

in step S101, receiving characteristic parameters of a route sent by a vehicle monitoring platform, and expanding a plurality of road segments of the route into a plurality of rectangles respectively according to the characteristic parameters.

In the embodiment of the present invention, the characteristic parameters of the route comprises a route ID (Identity), a route attribute, a start time and a finish time of a speed limit, a total number of inflection points of the route, identifications of inflection points, longitude and latitude of inflection points, widths of road segments, attributes of road segments, driving time threshold value of the road segments, fastest speed limit of the road segments and excessive speed duration time. Wherein, the route ID is referred to as the name of the route, different routes have different names; the route attribute is referred to as a road attribute, e.g., a municipal road or a residential road; the start time and the finish time of speed limit is referred to as the start time of the speed limit and the finish time of the speed limit; the total number of the inflection points of the route is referred to as the number of the road segments of the route, each of the road segments comprises two longitude and latitude at a start point and an end point thereof, which are referred to as the inflection points; an inflection point ID is referred to as the name of the inflection point, different inflection points have different names; a road segment ID is referred to as the name of the road segment, different road segments have different names; longitude and latitude of an inflection point is referred to as the coordinate of the inflection point; a width of a road segment is referred to as a vertical distance between two road shoulders of the road segment, which can also be described as a lane width of the road segment; a road segment attribute is referred to as the attribute of the road segment, e.g., a fast lane of the municipal, trunk road, a secondary trunk road and a branch road; a road segment driving time threshold value is referred to as the time spend on passing the road segment in the fastest speed limit value; a fastest speed limit of the road segment is referred to as the speed limit of the road segment; a road segment excessive speed duration time is referred to as a time interval lasted from a time point when the vehicle reaches the speed limit to a time point when it is judged that the vehicle exceeds the speed limit.

Figure 2:
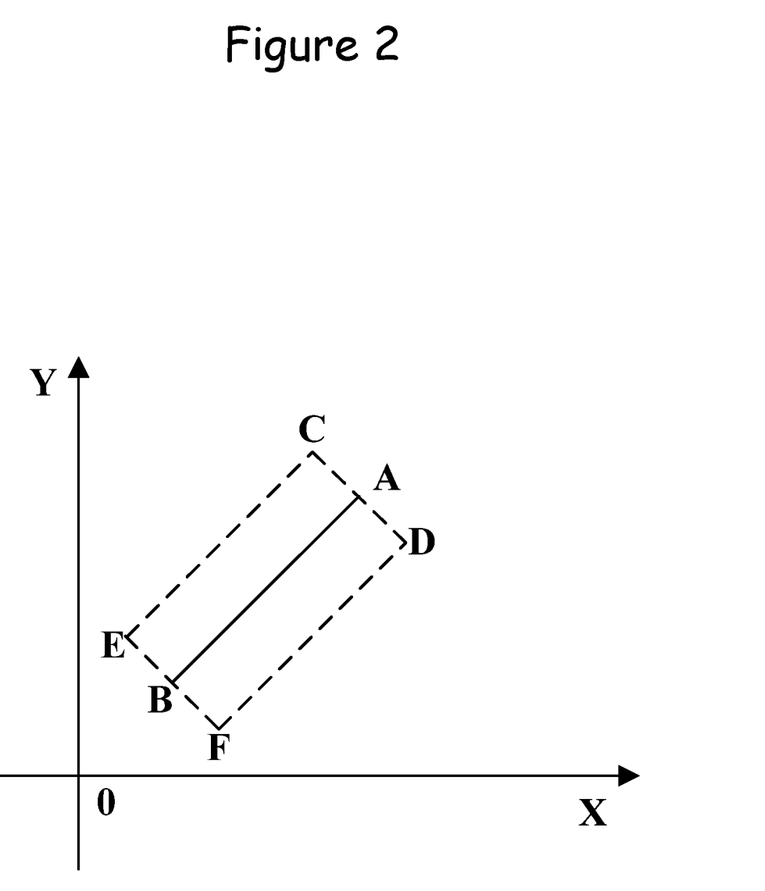
FIG. 2 illustrates a structural schematic view of expanded rectangles of a road segment in the embodiment of the present invention.

In the embodiment of the present invention, receiving characteristic parameters of the route sent by the vehicle monitoring platform, and expanding the plurality of road segments of the route to be a plurality of rectangles respectively specifically comprises: receiving the characteristic parameters of the route sent by the vehicle monitoring platform, and adding index value into each of the road segments of the route and each of the inflection points in each of the road segments, each of the road segments comprises a start inflection point and an end inflection point; obtaining longitude and latitude of the start inflection point and the end inflection point in each of the road segments and a road segment width of each of the road segments from the characteristic parameters according to the index value, and expanding each of the road segments to be a rectangle respectively according to the longitude and latitude of the start inflection point and the end inflection point in each of the road segments and the road segment width of each of the road segments. FIG. 2 shows an expanded rectangle of a road segment, please referring to FIG. 2, an expanded rectangle of a road segment AB is a rectangle CDEF, wherein A and B are the start inflection point and the end inflection point of the road segment AB respectively, EF and CD are the width of the road segment AB, AB is the mid-perpendicular of EF and CD.

In step S102, diving the plurality of rectangles into blocks sequentially, wherein each of the blocks comprises at least two rectangles, calculating a minimum enclosing rectangle of the at least two rectangles, and collecting vertex information of the minimum enclosing rectangle in each of the blocks so as to establish a hash table. As a preferable embodiment, each of the blocks in the embodiment of the present invention comprises 16 inflection points, that is, each of the blocks comprises 15 end-to-end connected rectangles.

Figure 3:
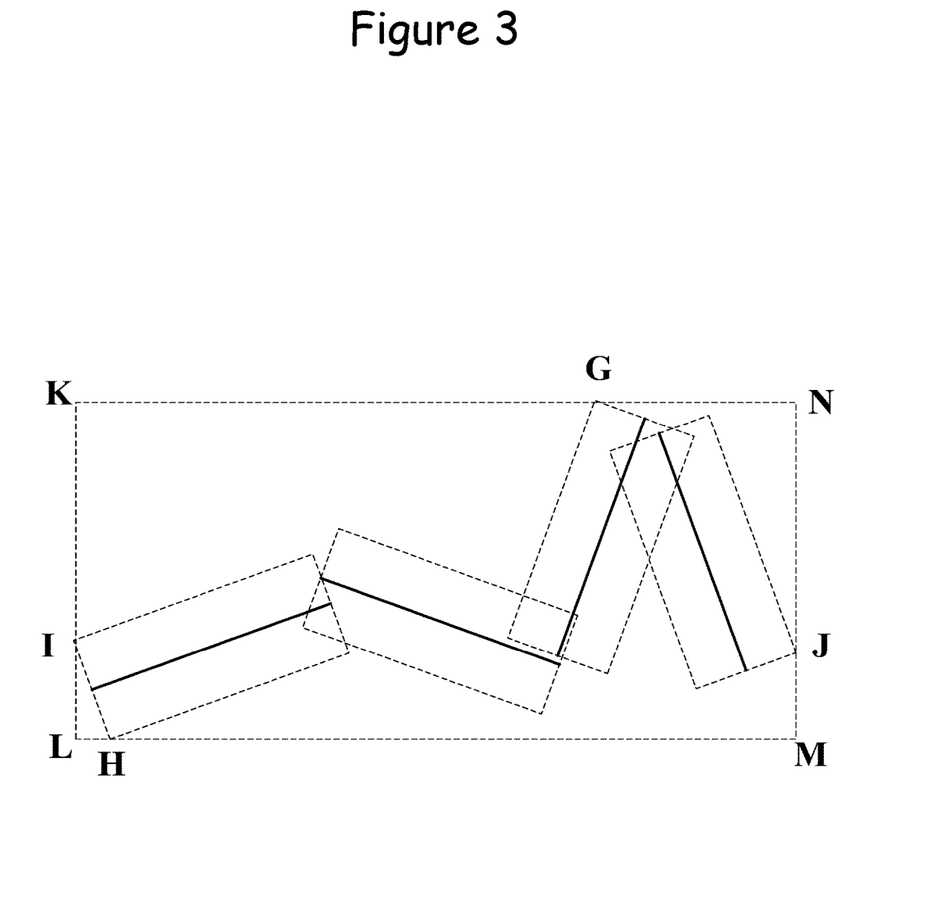
FIG. 3 illustrates a structural schematic view of a minimum enclosing rectangle in the embodiment of the present invention.

In the embodiment of the present invention, calculating the minimum enclosing rectangle of the at least two rectangles specifically comprises: calculating longitude and latitude of a topmost vertex, a bottommost vertex, a leftmost vertex and a rightmost vertex in the at least two rectangles, and obtaining the minimum enclosing rectangle of the at least two rectangles according to the longitude and latitude of the topmost vertex, the bottommost vertex, the leftmost vertex and the rightmost vertex. FIG. 3 illustrates a schematic view of the minimum enclosing rectangle in the embodiment of the present invention, the block shown in FIG. 3 comprises 5 inflection points and 4 rectangles, when the minimum enclosing rectangle of the 4 rectangles in the block is calculated, the topmost vertex, the bottommost vertex, the leftmost vertex and the rightmost vertex (G, H, I, J) in vertexes of each of the 4 rectangles are found firstly, and a minimum enclosing rectangle KLMN of the 4 rectangles is obtained subsequently according to the topmost vertex, the bottommost vertex, the leftmost vertex and the rightmost vertex (G, H, I, J).

In the embodiment of the present invention, vehicular terminal expands road segments in the route into rectangles according to the characteristic parameters, then divide the rectangles into blocks and establish hash tables to form characteristic documents, the characteristic documents are stored in a storage predetermined by the vehicular terminal.

In step S103, obtaining an instant longitude and latitude of the moving vehicle, searching in the hash table according to the instant longitude and latitude so as to determine the block where the vehicle is currently located, and using a preset algorithm to determine the road segment where the vehicle is currently located.

In the embodiment of the present invention, when the vehicle is operated, vehicle information in a memory will be initialized firstly by the vehicular terminal, and the hash table is loaded from the predetermined storage; after the block where the vehicle is located is found according to the hash table, the block where the vehicle is currently located and information of two blocks adjacent to the block where the vehicle is currently located are read out from the predetermined storage into the memory, and it is ensured that the memory of the vehicular terminal stores data of the three blocks continuously and subsequently; when the block where the vehicle is currently located has been changed, information of three blocks in the memory is updated simultaneously. In the embodiment of the present invention, the block where the vehicle is currently located is found firstly according to the hash table, and then data in the block where the vehicle is currently located is traversed by adopting an improved arc length algorithm, so that the road segment where the vehicle is currently located can be obtained; aiming at a plurality of routes and road segments, access times of the characteristic documents can be reduced, and the position where the vehicle is currently located can be determined in real time and quickly; in addition, since the memory only stores the hash table and data of three blocks, the remaining data is stored in the predetermined storage altogether; therefore, a memory usage of the vehicular terminal won't be increased.

Figure 4:
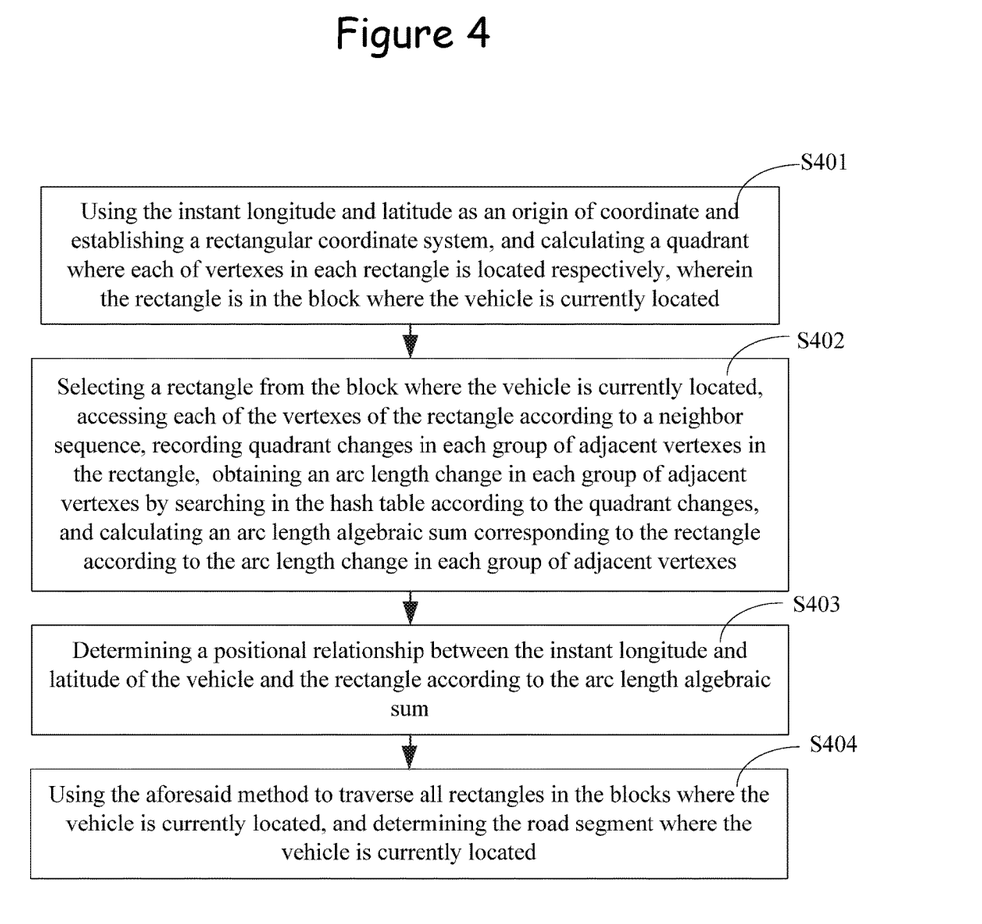
FIG. 4 illustrates a specific implementation flow diagram of judging where the vehicle is currently located by adopting a preset algorithm provided by the embodiment of the present invention.

FIG. 4 illustrates a specific implementation flow chart of determining the road segment where the vehicle is currently located by using the preset algorithm in the embodiment of the present invention.

Referring to FIG. 4, in the embodiment of the present invention, the preset algorithm is an improved arc length algorithm, determining the road segment where the vehicle is currently located by using the preset algorithm specifically comprises:

in step S401, using the instant longitude and latitude of the vehicle as an origin of the coordinate and establishing a rectangular coordinate system, respectively calculating quadrants of vertexes of each of the rectangles in the block where the vehicle is currently located; in the embodiment of the present invention, in the rectangular coordinate system, the plane is divided into four quadrants, and coordinate symbols (x, y) of the quadrants are labeled as (+, +), (−, +), (−, −), (+, −) respectively.

In step S402, selecting a rectangle from the block where the vehicle is currently located, accessing vertexes of the rectangle according to a neighbor sequence, recording quadrant changes in each group of adjacent vertexes in the rectangle, and obtaining an arc length change in each group of adjacent vertexes by searching in the hash table according to the quadrant changes, and calculating an arc length algebraic sum corresponding to the rectangle according to the arc length change in each group of adjacent vertexes.

In step S403, determining positional relationship between the instant longitude and latitude of the vehicle and the rectangle according to the arc length algebraic sum.

In step S404, using the aforesaid method to traverse all rectangles in the block where the vehicle is currently located, and determining the road segment where the vehicle is currently located.

Figure 5:
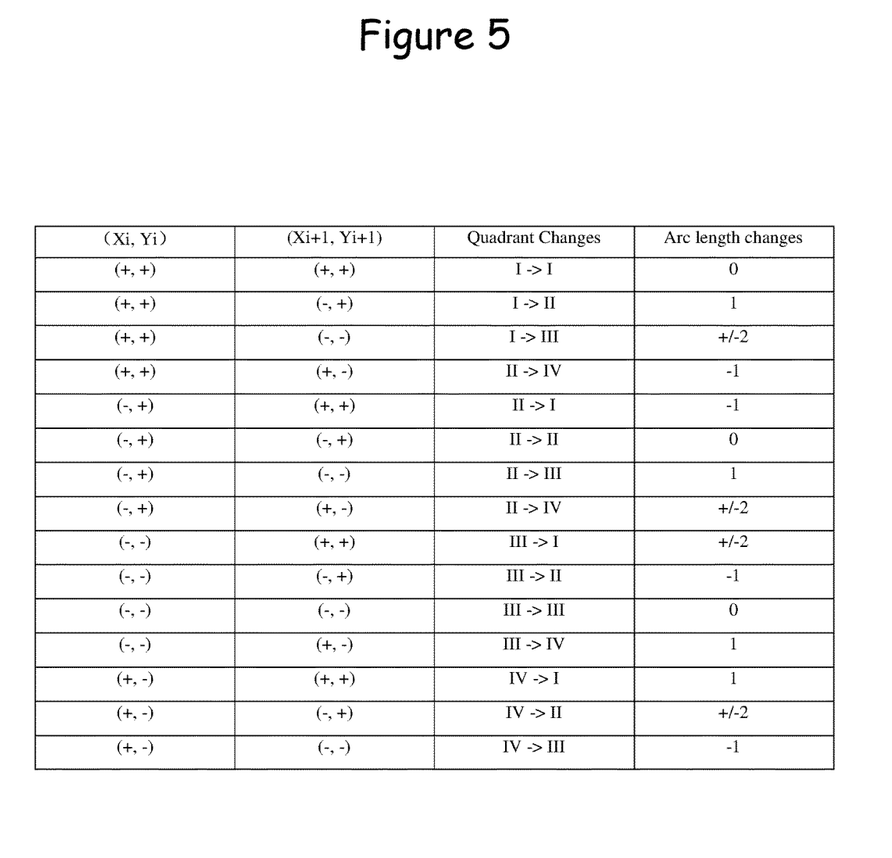
FIG. 5 illustrates a correspondence relationship table of quadrant changes and arc length changes of adjacent vertexes of a rectangle in the embodiment of the present invention.

In the embodiment of the present invention, with respect to a vertex P in each rectangle, the quadrant where the vertex P is located is only considered, then, each of the vertexes in the rectangle is accessed according to the neighbor sequence, quadrants where the vertex P and a vertex P (i+1) are located are analyzed; then, an arc length change of the vertex P and the vertex P (i+1) is obtained by searching the hash table according to a quadrant change of the vertex P and the vertex P (i+1), a correspondence relationship table of the quadrant change and the arc length change of the adjacent vertexes is shown in FIG. 5, there are four conditions listed as follows:

when vertex P (i+1) and vertex P is located in the same quadrant, at this time, the arc length algebraic sum adds 0;

when vertex P (i+1) is located in a quadrant that follows the quadrant where vertex P is located, at this time, the arc length algebraic sum adds 1;

when vertex P (i+1) is located in a quadrant that is ahead of the quadrant where vertex P is located, at this time, the arc length algebraic sum subtracts 1;

when vertex P (i+1) is located in a quadrant that is opposite to the quadrant where vertex P is located, $f=y(i+1)*x-x(i+1)*y$ is calculated firstly; if $f=0$, it is judged that the instant longitude and latitude of the vehicle is located at a periphery of the rectangle; if f<0, the arc length algebraic sum adds 2.

In this way, each vertex P of the rectangle is accessed, and arc length algebraic sums of all adjacent vertexes in the rectangle are accumulated; if an accumulative result is 4, it means that the current position of the vehicle is located in the interior of the rectangle; if the result is 2, it means that the current position of the vehicle is located at the periphery of the rectangle; if the result is 0, it means that the current position of the vehicle is located at the exterior of the rectangle. In addition, it needs to be noted that, if the calculated current position of the vehicle is located at a dead zone between two rectangles, which rectangle the current position of the vehicle is currently located is further judged by point to point distance.

In addition, in the embodiment of the present invention, when the vehicle is operated, since prior information are stored in the memory of the vehicle, the vehicular terminal can determine whether a driving direction of the vehicle is up or down according to the change of road segment index information, and then a judgment can be performed preferentially at a road segment adjacent to the road segment where the vehicle is located at a last time point according to the driving direction of the vehicle; if the vehicle isn't located at the road segment adjacent to the road segment where the vehicle is located at the last time point, two blocks adjacent to the block where the vehicle is located at the last time point is searched and a judgment is performed; if the current position of the vehicle still can't be found, it is judged that the vehicle has deviated from a prescribed route; if the road segment where the vehicle is currently located is found, a next excessive speed judgment is performed.

In S104, comparing the current speed of the vehicle with the limit speed of the road segment where the vehicle is currently located, and judging whether the current speed of the vehicle exceeds the limit speed or not; if yes, uploading excessive speed information and the instant longitude and latitude of the vehicle to the vehicle monitoring platform.

In the embodiment of the present invention, when the vehicle exceeds the speed limit, the vehicular terminal can also broadcast excessive speed warning information automatically, when the speed limit value of a road segment in the front is changed, a forecast will be performed by the vehicular terminal when the vehicle is located at a position 100 meters ahead of the coming road segment; specifically, when the vehicle is driving, a driving direction of the vehicle can be divided into an up direction and a down direction, when the characteristic parameters of the route is analyzed by the vehicular terminal, the front road segment of which the speed limit needs to be forecasted is accurately calculated and positioned according to the length of the road segment; when the vehicle has moved to the positioned place, the speed limit of the front road segment can be broadcasted automatically by the vehicular terminal. For example, when the vehicle enters a specified route initially, the driver will be reminded by the vehicular terminal in the form of "you have entered the specified route"; when the front road segment doesn't corresponds to the speed limit of the front road segment, a warning and reminding in the form of "there is a speed limit of XXX km/h for the front road segment" is forecasted when the vehicle is located at a place 100 meters ahead of the coming road segment; when a driving time of the vehicle on the current road segment having the speed limit exceeds 5 minutes, or a driving distance of the vehicle on the current road segment having the speed limit exceeds 5 kilometers, a reminder in the form of "there is a speed limit of XXX km/h for the current road segment" is sent out for one time; when a speed difference between the vehicle speed and the speed limit is less than 10 km/h, a reminder in the form of "you are about to exceed the speed limit, please take control of the vehicle speed" is sent out; when the vehicle has already broken the speed limit, a reminder in the form of "you have already exceeded the speed limit, please take control of the vehicle speed" is sent out, moreover, the excessive speed information and the position where the vehicle is located when it exceeds the speed limit are uploaded to the vehicle monitoring platform; when the vehicle is driven away from a last road segment of the route, a reminder in the form of "you have already driven away from the stipulated route" is sent out.

From above, it can be seen that, the method for segmentally limiting the speed of a vehicle provided by the embodiment of the present invention can not only enable the vehicular terminal to automatically judge whether the vehicle has already exceeded the speed limit or not, and achieves a higher instantaneity and a low memory usage, but also notify the vehicle monitoring platform in time when the vehicle has exceeded the speed limit, so that an administrative staff of the vehicle monitoring platform can take corresponding measures for the driver who drives the vehicle at the excessive speed, and thus occurrence of safety accidents can be avoided.

Figure 6:
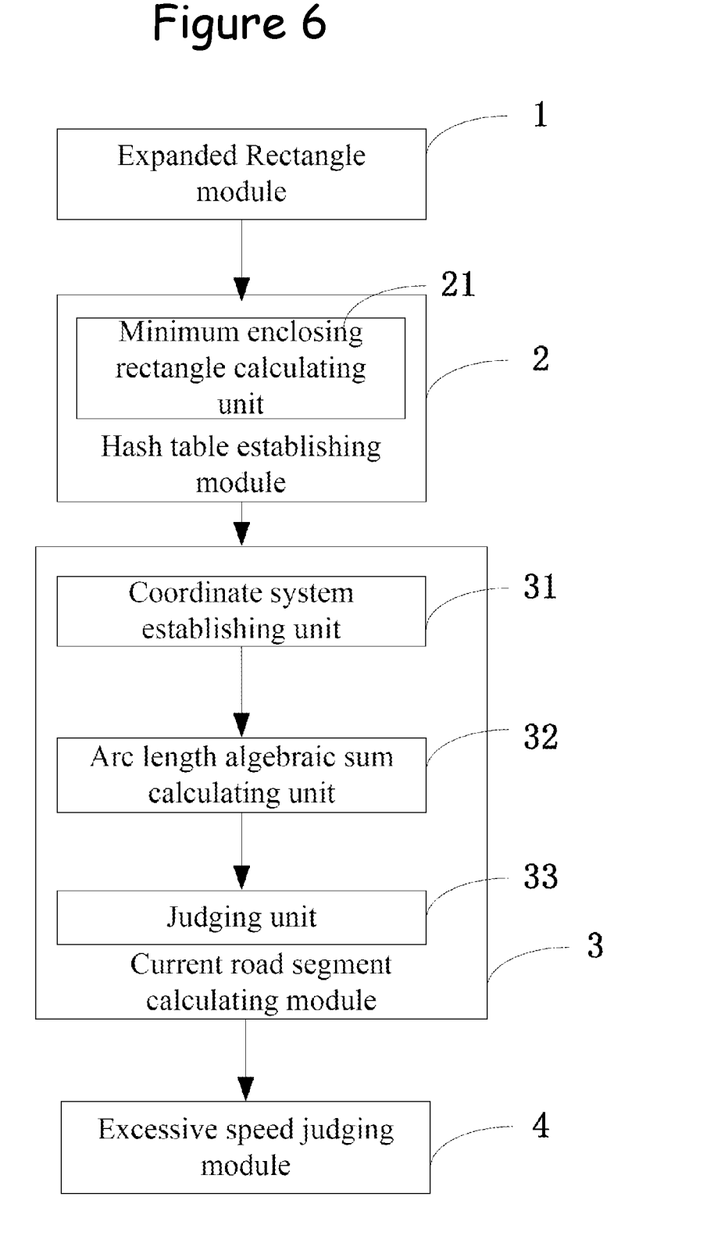
FIG. 6 illustrates a structural schematic view of a system for segmentally limiting speed of a vehicle provided by another embodiment of the present invention.

FIG. 6 illustrates a structural schematic view of a system for segmentally limiting the speed of a vehicle, the system is installed in the vehicular terminal and is configured for executing the method for segmentally limiting the speed of a vehicle provided by the embodiment shown in FIGS. 1-5. For convenient explanation, only the parts relevant to the embodiment of the present invention are illustrated.

Please refer to FIG. 6, the system for segmentally limiting the speed of a vehicle comprises:

an expanded rectangle calculating module 1 configured for receiving characteristic parameters of a route sent by a vehicle monitoring platform, and expanding a plurality of road segments of the route into a plurality of rectangles respectively according to the characteristic parameters of the route;

a hash table establishing module 2 configured for dividing the plurality of rectangles into blocks sequentially, wherein each block comprises at least two rectangles; and calculating a minimum enclosing rectangle of the at least two rectangles, and counting vertex information of the minimum enclosing rectangle of each block so as to establish a hash table;

a current road segment calculating module 3 configured for obtaining an instant longitude and latitude of a moving vehicle, searching in the hash table according to the instant longitude and latitude so as to determine a block where the vehicle is currently located, and determining a road segment where the vehicle is currently located by adopting a preset algorithm; and an excessive speed judging module 4 configured for comparing a current speed of the vehicle with a limiting speed of the road segment where the vehicle is currently located, judging whether the vehicle exceeds the limiting speed, and uploading excessive speed information and the instant longitude and latitude of the vehicle to the vehicle monitoring platform if the vehicle exceeds the speed limit.

Selectively, the expanded rectangle calculating module is specifically configured for:

receiving characteristic parameters of the route sent by the vehicle monitoring platform, and adding index value for each of the road segments of the route and road inflection points in each of the road segments, wherein each of the road segments comprises a start inflection point and an end inflection point; and obtaining longitude and latitude of the start inflection point and the end inflection point, and a road width of each of the road segments from the characteristic parameters of the route according to the index value, and expanding each of the road segments into a rectangle respectively according to the longitude and latitude of the start inflection point and the end inflection point and the road width of each of the road segments.

Selectively, the hash table establishing module comprises:

a minimum enclosing rectangle calculating unit 21 configured for calculating longitude and latitude of a topmost vertex, a bottommost vertex, a leftmost vertex, and a rightmost vertex of each of the at least two rectangles, and obtaining the minimum enclosing rectangle of the at least two rectangles according to the longitude and latitude of the topmost vertex, the bottommost vertex, the leftmost vertex, and the rightmost vertex.

Selectively, the current road segment calculating module 3 comprises:

a coordinate system establishing unit 31 configured for using the instant longitude and latitude as an origin of coordinate and establishing a rectangular coordinate system, and calculating a quadrant where each of vertexes in each rectangle is located respectively, wherein the rectangle is in the block where the vehicle is currently located;

an arc algebraic sum calculating unit 32 configured for selecting a rectangle from the block where the vehicle is currently located, accessing each of the vertexes of the rectangle according to a neighbor sequence, recording quadrant changes in each group of adjacent vertexes in the rectangle, obtaining an arc length change of each group of adjacent vertexes by searching in the hash table according to the quadrant changes, and calculating an arc length algebraic sum corresponding to the rectangle according to the arc length change in each group of adjacent vertexes; and a judging unit 33 configured for determining a positional relationship between the instant longitude and latitude of the vehicle and the rectangle according to the arc length algebraic sum.

Selectively, the hash table establishing module 2 is further configured for storing characteristic documents and the hash table generated after dividing of the rectangles in a storage predetermined by a vehicular terminal; the current road segment calculating module 3 is further configured for initializing vehicle information in a memory when the vehicle is operating and loading the hash list from the storage; and when the block where the vehicle is currently located is found according to the hash table, the block information where the vehicle is currently located and block information of two blocks adjacent to the block where the vehicle is currently located is loaded from the storage into the memory, and it is ensured that the memory stores data of three blocks subsequently and continuously, and data of three blocks in the memory is updated simultaneously when the block where the vehicle is currently located has been changed.

It needs to be noted that, considering that the various modules in the system and the method embodiment of the present invention are based on the same conception, so that the various modules have the same technical effects with the method embodiment of the present invention, regarding the specific content, please refer to the description in the embodiment of the present invention, it is not repeated described herein.

The system for segmentally limiting the speed of a vehicle provided by the embodiment of the present invention, which, likewise, can not only make the vehicular terminal to automatically judge whether the vehicle has exceeded the speed limit or not, and thus achieves a higher real-time performance and a low memory usage, but also notify the vehicle monitoring platform in time when the vehicle has exceeded the speed limit, so that an administrative staff of the vehicle monitoring platform can take corresponding measures for the driver who drives the vehicle at the excessive speed, and thus occurrence of safety accidents can be avoided.

The aforementioned embodiments are only preferred embodiments of the present invention, and should not be regarded as being any limitation to the present invention. Any modification, equivalent replacement, improvement, and so on, which are made within the spirit and the principle of the present invention, should be included within the protection scope of the present invention.

The invention claimed is:

1. A method for segmentally limiting speed of vehicle, implemented by a vehicular terminal located in the vehicle, comprising:

receiving characteristic parameters of a route sent by a vehicle monitoring platform, and respectively expanding a plurality of road segments of the route into a plurality of rectangles according to the characteristic parameters of the route;

dividing the plurality of rectangles into blocks sequentially, wherein each block comprises at least two rectangles, calculating a minimum enclosing rectangle of the at least two rectangles, and establishing a hash table, wherein the hash table comprises vertex information of the minimum enclosing rectangle of each block, and the hash table and block information are stored in a storage predetermined by the vehicular terminal;

obtaining an instant longitude and latitude of a moving vehicle, searching in the hash table according to the instant longitude and latitude so as to determine a block where the vehicle is located, and judging a road segment where the vehicle is currently located; and comparing a current speed of the vehicle with a limiting speed of the road segment where the vehicle is currently located, judging whether the vehicle exceeds the limiting speed; if yes, uploading excessive speed information and the instant longitude and latitude of the vehicle to the vehicle monitoring platform;

wherein the step of judging a road segment where the vehicle is currently located comprises:

using the instant longitude and latitude as an origin of coordinate and establishing a rectangular coordinate system, and calculating a quadrant where each of vertexes in each rectangle is located respectively, wherein the rectangle is in the block where the vehicle is currently located;

selecting a rectangle from the block where the vehicle is currently located, accessing each of the vertexes of the rectangle according to a neighbor sequence, recording quadrant changes in each group of adjacent vertexes in the rectangle, and obtaining an arc length change in each group of adjacent vertexes by searching in the hash table according to the quadrant changes, and calculating an arc length algebraic sum corresponding to the rectangle according to the arc length change in each group of adjacent vertexes;

determining a positional relationship between the instant longitude and latitude of the vehicle and the rectangle according to the arc length algebraic sum; and using the aforesaid method to traverse all rectangles in the blocks where the vehicle is currently located, and determining the road segment where the vehicle is currently located.

2. The method for segmentally limiting speed of vehicle according to claim 1, wherein the step of receiving characteristic parameters of a route sent by a vehicle monitoring platform, and expanding a plurality of road segments of the route into a plurality of rectangles respectively according to the characteristic parameters of the route specifically comprises:

receiving characteristic parameters of the route sent by the vehicle monitoring platform, and adding index value for each of the road segments of the route and road inflection points in each of the road segments, wherein each of the road segments comprises a start inflection point and an end inflection point; and obtaining longitude and latitude of the start inflection point and the end inflection point and a road width of each of the road segments from the characteristic parameters of the route according to the index value, and expanding each of the road segments into a rectangle respectively according to the longitude and latitude of the start inflection point and the end inflection point and the road width of each of the road segments.

3. The method for segmentally limiting speed of vehicle according to claim 1, wherein the step of calculating the minimum enclosing rectangle of the at least two rectangles specifically comprises:

calculating longitude and latitude of a topmost vertex, a bottommost vertex, a leftmost vertex, and a rightmost vertex of each of the at least two rectangles, and obtaining the minimum enclosing rectangle of the at least two rectangles according to the longitude and latitude information of the topmost vertex, the bottommost vertex, the leftmost vertex, and the rightmost vertex.

4. The method for segmentally limiting speed of vehicle according to claim 1, wherein characteristic documents generated after dividing of the rectangles are stored in the storage; when the vehicle is operating, initializing vehicle information in a memory firstly by the vehicular terminal, and loading the hash list from the storage; and then when the block where the vehicle is located is found according to the hash list, loading the block information where the vehicle is currently located and block information of two blocks adjacent to the block where the vehicle is currently located from the storage into the memory, and ensuring that the memory stores data of three blocks subsequently and continuously; and updating data of three blocks in the memory simultaneously when the block where the vehicle is currently located has been changed.

5. A system for segmentally limiting speed of vehicle, applied for measuring speed of vehicles in real time, comprising:

an expanded rectangle calculating module configured for receiving characteristic parameters of a route sent by a vehicle monitoring platform, and expanding a plurality of road segments of the route into a plurality of rectangles respectively according to the characteristic parameters of the route;

a hash table establishing module configured for dividing the plurality of rectangles into blocks sequentially, wherein each block comprises at least two rectangles, and calculating a minimum enclosing rectangle of the at least two rectangles, and establishing a hash table, wherein the hash table comprises vertex information of the minimum enclosing rectangle of each block;

a current road segment calculating module configured for obtaining an instant longitude and latitude of a moving vehicle, searching in the hash table according to the instant longitude and latitude so as to determine a block where the vehicle is currently located, and determining a road segment where the vehicle is currently located; and an excessive speed judging module configured for comparing a current speed of the vehicle with a limiting speed of the road segment where the vehicle is currently located, judging whether the vehicle exceeds the limiting speed, and uploading excessive speed information and the instant longitude and latitude of the vehicle to the vehicle monitoring platform if the vehicle exceeds the speed limit;

wherein the current road segment calculating module comprises:

a coordinate system establishing unit configured for using the instant longitude and latitude as an origin of coordinate and establishing a rectangular coordinate system, and calculating a quadrant where each of vertexes in each rectangle is located respectively, wherein the rectangle is in the block where the vehicle is currently located;

an arc algebraic sum calculating unit configured for selecting a rectangle from the block where the vehicle is currently located, accessing each of the vertexes of the rectangle according to a neighbor sequence, recording quadrant changes in each group of adjacent vertexes in the rectangle, obtaining an arc length change of each group of adjacent vertexes by searching in the hash table according to the quadrant changes, and calculating an arc length algebraic sum corresponding to the rectangle according to the arc length change in each group of adjacent vertexes; and a judging unit configured for determining a positional relationship between the instant longitude and latitude of the vehicle and the rectangle according to the arc length algebraic sum.

6. The system for segmentally limiting speed of vehicle according to claim 5, wherein the expanded rectangle calculating module is specifically configured for:

receiving characteristic parameters of the route sent by the vehicle monitoring platform, and adding index value for each of the road segments of the route and road inflection points in each of the road segments, wherein each of the road segments comprises a start inflection point and an end inflection point; and obtaining longitude and latitude of the start inflection point and the end inflection point, and a road width of each of the road segments from the characteristic parameters of the route according to the index value, and expanding each of the road segments into a rectangle respectively according to the longitude and latitude of the start inflection point and the end inflection point and the road width of each of the road segments.

7. The system for segmentally limiting speed of vehicle according to claim 5, wherein the hash table establishing module comprises:

a minimum enclosing rectangle calculating unit configured for calculating longitude and latitude information of a topmost vertex, a bottommost vertex, a leftmost vertex, and a rightmost vertex of each of the at least two rectangles, and obtaining the minimum enclosing rectangle of the at least two rectangles according to the longitude and latitude information of the topmost vertex, the bottommost vertex, the leftmost vertex, and the rightmost vertex.

8. The system for segmentally limiting speed of vehicle according to claim 5, wherein the hash table establishing module is further configured for storing characteristic documents and the hash table generated after dividing of the rectangles in a storage predetermined by a vehicular terminal; the current road segment calculating module is further configured for initializing vehicle information in a memory when the vehicle is operating and loading the hash list from the storage; when the block where the vehicle is currently located is searched according to the hash table, the block information where the vehicle is currently located and block information of two blocks adjacent to the block where the vehicle is currently located is loaded from the storage into the memory, and it is ensured that the memory stores data of three blocks subsequently and continuously, and data of three blocks in the memory is updated simultaneously when the block where the vehicle is currently located has been changed.

* * * * *